(12) United States Patent
Huang et al.

(10) Patent No.: US 6,229,815 B1
(45) Date of Patent: May 8, 2001

(54) METHOD OF OPTIMAL ROUTING IN A BI-DIRECTIONAL LINE SWITCHED SONET RING

(75) Inventors: Jennifer Shu-Chen Huang, Richardson; Sridhar S. Nathan; Jonathan Weston-Dawkes, both of Plano, all of TX (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/036,392

(22) Filed: Mar. 6, 1998

(51) Int. Cl.[7] .................................................. H04L 12/403
(52) U.S. Cl. .......................................... 370/437; 370/907
(58) Field of Search .................................. 370/2, 232, 230, 370/231, 229, 234, 233, 235, 253, 400, 222, 223, 224, 351, 452, 907, 437

(56) References Cited

U.S. PATENT DOCUMENTS 5,546,542 * 8/1996 Cosares et al. .................... 709/241
5,729,692 * 3/1998 Qiu et al. .......................... 709/241
6,061,331 * 5/2000 Conway et al. ..................... 370/232

\* cited by examiner

*Primary Examiner*—Chau Nguyen
*Assistant Examiner*—Alexander Boakye

(57) ABSTRACT

A method of assigning capacity and routing flow in a bi-directional line switched SONET ring based upon ring topology and demand data defines for each pair of links of the ring a two-edge cut. Each two-edge cut divides the ring into two sets of nodes. For each two-edge cut, the capacity assignment method calculates a demand equal to the sum of all demands between nodes on opposite sides of the two-edge cut. The capacity assignment method then determines the maximum demand and sets the capacity of each link equal to one-half the maximum demand plus one-half of one demand unit. The flow routing method of the present invention calculates a cut difference for each two-edge cut. A critical cut is a two-edge cut having a cut difference equal to or less than one. If there is a critical cut with demands greater than zero on the same side of the critical cut, the method performs a first processing routine. If there is no critical cut with demands greater than zero on the same side of the critical cut, the method performs a second processing routine. The flow routing method performs the first or second processing routine until the occurrence of a terminating condition.

21 Claims, 8 Drawing Sheets

| INDEX | NODES | DEMAND | LINKS |
|---|---|---|---|
| 1 | 1,2 | 5 | |
| 2 | 1,3 | 4 | |
| 3 | 1,4 | 3 | |
| 4 | 1,5 | 5 | |
| 5 | 1,6 | 3 | |
| 6 | 2,3 | 4 | |
| 7 | 2,4 | 5 | |
| 8 | 2,5 | 4 | |
| 9 | 2,6 | 4 | |
| 10 | 3,4 | 4 | |
| 11 | 3,5 | 4 | |
| 12 | 3,6 | 5 | |
| 13 | 4,5 | 3 | |
| 14 | 4,6 | 4 | |
| 15 | 5,6 | 3 | |

FIG. 10

| INDEX | TWO-EDGE CUT($e_k,e_l$) | $C(e_k)+C(e_l)$ | $D(e_k,e_l)$ | CUT_DIFF($e_k,e_l$) | FLAG |
|---|---|---|---|---|---|
| 1 | 1,2 | 38 | 22 | 16 | 0 |
| 2 | 1,3 | 38 | 35 | 3 | 0 |
| 3 | 1,4 | 38 | 36 | 2 | 0 |
| 4 | 1,5 | 38 | 33 | 5 | 0 |
| 5 | 1,6 | 38 | 20 | 18 | 0 |
| 6 | 2,3 | 38 | 21 | 17 | 0 |
| 7 | 2,4 | 38 | 32 | 6 | 0 |
| 8 | 2,5 | 38 | 37 | 1 | 0 |
| 9 | 2,6 | 38 | 32 | 6 | 0 |
| 10 | 3,4 | 38 | 19 | 19 | 0 |
| 11 | 3,5 | 38 | 32 | 6 | 0 |
| 12 | 3,6 | 38 | 37 | 1 | 0 |
| 13 | 4,5 | 38 | 19 | 19 | 0 |
| 14 | 4,6 | 38 | 32 | 6 | 0 |
| 15 | 5,6 | 38 | 19 | 19 | 0 |

FIG. 11

| LINK | CAPACITY | DEMANDS |
|---|---|---|
| 1 | 19 | |
| 2 | 19 | |
| 3 | 19 | |
| 4 | 19 | |
| 5 | 19 | |
| 6 | 19 | |

FIG. 12

METHOD OF OPTIMAL ROUTING IN A BI-DIRECTIONAL LINE SWITCHED SONET RING

FIELD OF THE INVENTION

The present invention relates generally to communication network design and management, and more particularly to a method of assigning capacity and routing flow in a bi-directional line switched SONET ring.

DESCRIPTION OF THE PRIOR ART

Modern digital telecommunications systems are built upon a network consisting of a plurality of nodes or sites that are interconnected by spans or transmission facilities. The primary goal of telecommunications network design is to serve the demand in capacity between the nodes at the least cost, while maintaining an acceptable level of survivability in the event of failures. Two elements of cost in a network are transmission costs and equipment costs. Transmission cost is generally based upon the transmission distance. Equipment cost is based upon the cost of digital cross-connects and add-drop multiplexers.

Recently, there has been a move away from mesh topology for telecommunications networks toward a ring topology. In a bi-directional line switched ring, the demands on the ring are allowed to be routed on either side of the ring, and the capacity for all spans of the ring is required to be the same. A ring topology offers advantages over a mesh topology, primarily in that a ring is self-healing and therefore may be restored in a matter of milliseconds after a failure. However, if the routing of traffic is not done properly, then there can be large amounts of capacity not utilized and the total capacity deployed on the ring can be significantly higher than what is really required. It is therefore a problem to load traffic on a bi-directional line switched ring so that the number of ring layers can be minimized.

The traffic loading problem has two components. The first component is to find the minimum capacity required for the ring. The second requirement is to find an integer multiflow that satisfies both capacity and demand constraints. The ring loading traffic problem has received much attention. Linear programming approaches and heuristic algorithms have been proposed for solving the problem. None of the previous known methods of routing in a mesh network, such as shortest path, least hop, or min-cost flow routing is appropriate for loading traffic on a ring or for determining the ring capacity requirement. The methods developed in connection with mesh networks do not consider the fact that ring capacities need to be the same for every span in the ring. Therefore, mesh routing techniques tend to congest certain spans of the ring and underutilize other spans.

Accordingly, a new method is needed to balance traffic loads on a ring so that the overall capacity requirement of the ring can be minimized.

SUMMARY OF THE INVENTION

The present invention provides method of assigning capacity and routing flow in a bi-directional line switched SONET ring based upon ring topology and demand data. The bi-directional line switched SONET ring includes N nodes $n_i$ connected in a ring by N links $e_k$. There is a demand $d(n_i,n_j)$ between each pair of nodes $(n_i,n_j)$.

The capacity assignment method of the present invention defines for each pair of links $(e_k,e_l)$ of the ring a two-edge cut. Each two-edge cut divides the ring into two sets of nodes, i.e. a set of nodes X between link $e_k$ and link $e_l$, and a set of nodes (N-X) between link $e_l$ and link $e_k$. For each two-edge cut $(e_k,e_l)$, the capacity assignment method calculates a demand $D(e_k,e_l)$ equal to the sum of all demands $d(n_i,n_j)$ wherein node $n_i$ is in set X and $n_j$ is in set (N-X). The capacity assignment method then determines the maximum demand $D(e_k,e_l)$ and sets the capacity $c(e_k)$ of each link $e_k$ equal to one-half the maximum demand $D(e_k,e_l)$ plus one-half demand unit.

The flow routing method of the present invention calculates a cut difference cut_diff$(e_k,e_l)$ for each two-edge cut $(e_k,e_l)$. Cut_diff$(e_k,e_l)$ is the difference between the capacity of a two-edge cut $(e_k,e_l)$, which is equal to the sum of $c(e_k)$ and $c(e_l)$, and the demand $D(e_k,e_l)$ of the two-edge cut $(e_k,e_l)$ Each cut difference cut_diff$(e_k,e_l)$ is always a positive number. A critical cut is a two-edge cut $(e_k,e_l)$ having a cut difference cut_diff$(e_k,e_l)$ equal to or less than one. If there is a critical cut $(e_k,e_l)$ with demands $d(n_i,n_j)$ greater than zero between nodes $(n_i,n_j)$ in X and demands $d(n_o,n_p)$ greater than zero between nodes $(n_o,n_p)$ in (N-X), then the flow routing method of the present invention performs a first processing routine. In the first processing routine, the method routes the demands $d(n_i,n_j)$ on the line formed by the nodes of X and routes the demands $d(n_o,n_p)$ on the line formed by the nodes of (N-X). Thus, in the first processing routine, the method routes demands on either side of critical cut $(e_k,e_l)$.

If there is no critical cut $(e_k,e_l)$ with demands $d(n_i,n_j)$ greater than zero between nodes $(n_i,n_j)$ in X and demands $d(n_o,n_p)$ greater than zero between nodes $(n_o,n_p)$ in (N-X), then the flow routing method of the present invention performs a second processing routine. In the second processing routine, the flow routing method of the present invention routes a flow $q(n_i,n_p)$ on a line $L(n_i,e_k,n_p)$, which is the line between nodes $n_i$ and $n_p$ that includes link $e_k$ of critical cut $(e_k,e_l)$. Thus, the second processing routine routes flow $q(n_i,n_p)$ across critical cut $(e_k,e_l)$. The amount of flow $q(n_i,n_p)$ is equal to the minimum of: (i) the demand $d(n_i,n_p)$; (ii) the minimum capacity of a link $e_k$ of line $L(n_i,e_k,n_p)$; and, (iii) one-half the minimum cut difference of all two-edge cuts with both edges on line $L(n_i,e_k,n_p)$.

The flow routing method of the present invention repeats either the first or second processing routine until a terminating condition occurs. A first terminating condition occurs when the demand $d(n_i,n_j)$ for all node pairs $(n_i,n_j)$ is equal to zero, which indicates that all demands have been routed. Upon the occurrence of the first terminating condition, the flow routing method is finished.

A second terminating condition occurs when the capacity $c(e_k)$ of any link $e_k$ is less than one. If the capacity $c(e_k)$ of link $e_k$ is equal to zero, then the flow routing method routes all remaining demands $d(n_i,n_j)$ on the line formed by deleting link $e_k$. If the capacity $c(e_k)$ of link $e_k$ is equal to 0.5 capacity units, the flow routing method of the present invention adds 0.5 capacity units to each link of the ring and routes one unit of demand $d(n_i,n_j)$ on line $L(n_i,e_k,n_j)$, which reduces the capacity $c(e_k)$ of link $e_k$ to zero. Then the flow routing method routes all remaining demands $d(n_i,n_j)$ on the line formed by deleting link $e_k$.

A third terminating condition occurs when any adjacent two-edge cut $(e_k,e_{k+1})$ has a cut difference of zero or one. If the initial capacity $c(e)$ of each link $e$ is an integer number of capacity units, the flow routing method routes a flow $q(n_i,n_j)$ on line $L(n_i,e_k,n_j)$ until $c(e_k)$ is equal to zero. The flow $q(n_i,n_j)$ is equal to the minimum of (i) $d(n_i,n_j)$ and (ii) the integer capacity of link $e_k$. When the capacity $c(e_k)$ of link $e_k$ is reduced to zero, the method routes all remaining demands $d(n_i,n_j)$ on the line formed by deleting link $e_k$. If the initial capacity $c(e)$ of each link e is a non-integer number of capacity units, the method adds 0.5 capacity units to each link and routes one unit of demand $d(n_i,n_j)$ for one node pair $(n_i,n_j)$ on line $L(n_i,e_k,n_j)$ Preferably, the flow routing method of the present invention performs certain preprocessing steps. The flow routing method of the present invention routes any adjacent demands $d(n_i,n_{i+1})$ on link $e_i$ connecting nodes $n_i$ and $n_{i+1}$ prior to performing the first or second processing routine. If the flow routing method is done in connection with the capacity assignment method of the present invention, there will always be at least one critical cut at the beginning of flow routing. However, the flow routing method of the present invention may receive as inputs demands and excess capacities. In such cases, the flow routing method of the present invention performs preprocessing to determine if there is any critical cut. If not, the method reduces the capacity of each link by 0.5 capacity units until there is a critical cut.

BRIEF DESCRIPTION OF THE DRAWINGS

FIG. 10 is a pictorial representation of a demand array according to the present invention.

FIG. 11 is a pictorial representation of a two-edge cut array according to the present invention.

FIG. 12 is a pictorial representation of a capacity array according to the present invention.

DESCRIPTION OF THE PREFERRED EMBODIMENT

Figure 1:
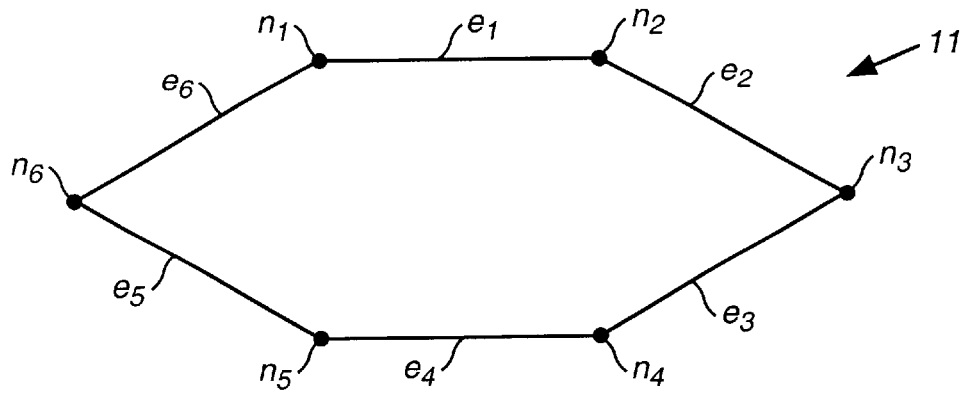
FIG. 1 is a pictorial representation of an optical ring.

Referring now to the drawings, in first FIG. 1, a ring is designated generally by the numeral 11. Ring 11 includes six nodes $n_1-n_6$ and six links or edges $e_1-e_6$. Those skilled in the art will recognize that the six node and link ring of FIG. 1 is for purposes of illustration and that optical rings can include any number of nodes up to about sixteen.

Between each pair of nodes of ring 11 there is a demand. Referring briefly to FIG. 10, there is shown a demand array according to the present invention for ring 11. The demand array of FIG. 10 includes a nodes column 13 and demand column 15. For the sake of clarity, the nodes of column 13 of the demand array of FIG. 10 are referred to by their subscripts.

The demand between nodes $n_1-n_6$ is carried bi-directionally around ring 11 through length $e_1-e_6$. For example, the three units of demand between nodes $n_1$ and $n_4$ may be carried clockwise through links $e_1-e_3$ or counter-clockwise through link $e_4-e_6$. Additionally, one unit of the three units of demand can be carried in one direction and the other two units can be carried in the other direction.

As will be apparent to those skilled in the art, it is not easy to determine the minimum capacity of each link e necessary to route all of the demands or to assign the flow in a ring. The method of the present invention includes two parts. The first part calculates the capacity requirements for satisfying all the demands on the ring. The second part routes demands based upon the capacity generated from the first part.

The method of the present invention is preferably computer implemented. The data structures utilized in the computer implementation include the demand array of FIG. 10, a two-edge cut array as illustrated in FIG. 11, and a capacity array as illustrated in FIG. 12.

Referring to FIG. 10, the demand array includes, in addition to node column 15 and demand column 15, a links column 17, which contains a linked list of links that is generated according to the present invention. Referring to FIG. 11, the two-edge cut array includes a two edge cut column 19 that contains each pair of links of the ring. A two-edge cut is an analytical tool that divides the ring under consideration into two parts. For example, two-edge cut (1,4) is a cut of links $e_1$ and $e_4$, which divides the nodes of ring 11 into a first subset consisting of nodes $n_2-n_4$, and a second subset consisting of nodes $n_5$, $n_6$, and $n_1$. An adjacent two-edge cut cuts adjacent links and divides the ring into a first set of nodes consisting of a single node and a second subset consisting of the rest of the nodes. Thus, two-edge cuts (1, 2), (1, 6), (2, 3), (3, 4), (4, 5) and (5, 6) are adjacent two-edge cuts.

The two-edge cut array of FIG. 11 also includes a capacity column 21, which contains the available capacity of the links of each two-edge cut $(e_k,e_l)$. Capacity column 21 is initially set to zero and it is populated with results of the capacity assignment process of the present invention. The values in capacity column 21 are manipulated during the flow routing process of the present invention.

The two-edge cut array of FIG. 11 includes a two-edge cut demand column 23. Demand column 23 contains for each two-edge cut $(e_k,e_l)$ a demand $D(e_k,e_l)$ that is the demand between the sets of nodes formed by each two-edge cut $(e_k,e_l)$. Demand column 23 is initially set to zero. The values in demand column 23 are computed in the capacity assignment process of the present invention and recomputed during the flow routing process of the present invention.

The two-edge cut array of FIG. 11 also includes a cut difference column 25. Cut difference column 25 includes a cut_diff$(e_k,e_l)$ value for each two-edge cut $(e_k,e_l)$. The values of cut difference column 25 are calculated during flow routing processing according to the invention and cut difference column 25 contains the difference between the values of capacity column 21 and demand column 23 for each two-edge cut $(e_k,e_l)$. According to the present invention, a value in cut difference column 25 can never be less than zero.

The two-edge cut array of FIG. 11 also includes a flag column 27. The values in flag column 27 are initially set to zero. As will be explained in detail hereinafter, a flag is set to one whenever a two-edge cut $(e_k,e_l)$ is processed during processing step A of flow routing processing of the present invention.

Referring now to FIG. 12, a capacity array includes a link column 29 and a capacity column 31. Capacity column 31 contains the available capacity of each link $e_k$ of the ring. Capacity column 31 is populated during capacity processing according to the present invention. The values of capacity column 31 are updated during flow routing according to the present invention.

Figure 2:
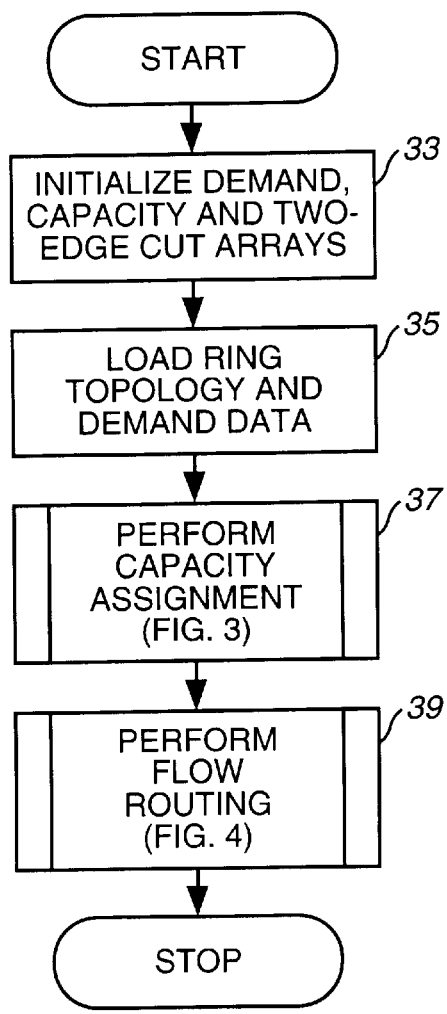
FIG. 2 is a high level flowchart of the method of the present invention.

Referring now to FIG. 2, there is shown a high level flow chart of processing according to the present invention. The demand, capacity, and two-edge cut arrays are initialized at block 33 and the ring topology and demand data are loaded at block 35. The demand data is loaded into demand column 15 of FIG. 10. After the ring topology and demand data are loaded, the method of the present invention performs capacity assignment processing, as indicated generally at block 37 and shown in detail with respect to FIG. 3. Then, the method of the present invention performs flow routing, as indicated generally at block 39, and shown in detail with respect to FIG. 4.

Figure 3:
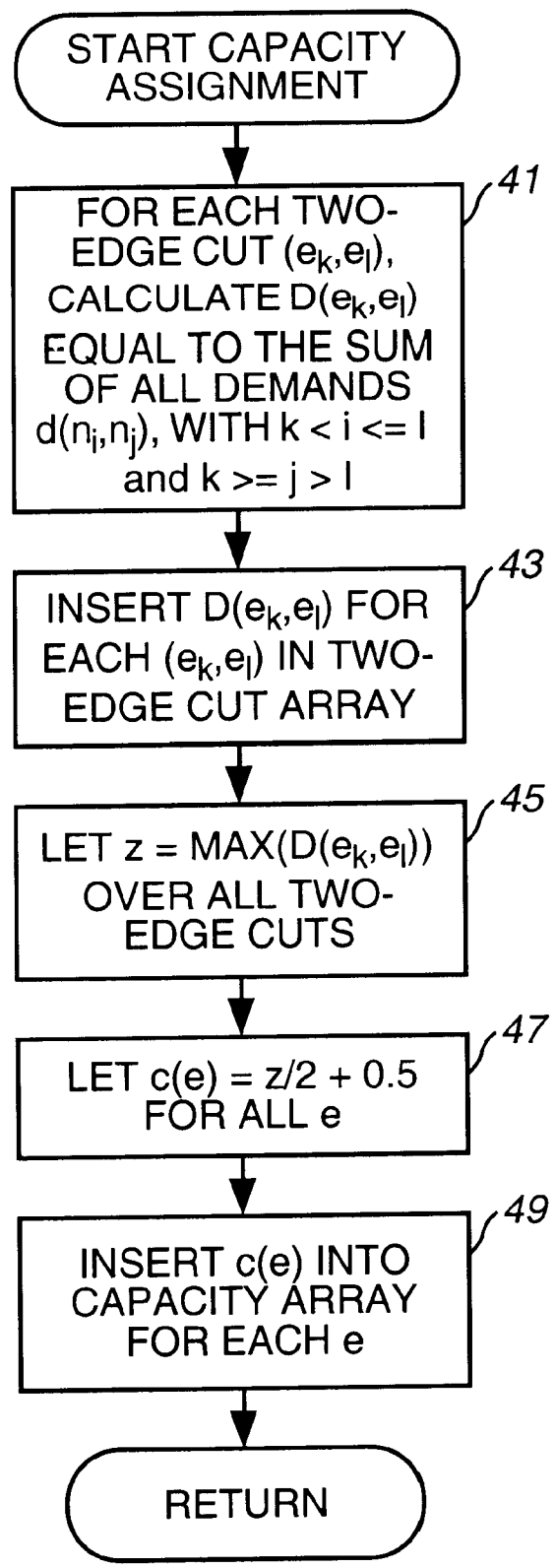
FIG. 3 is a flowchart of the capacity assignment process of the present invention.

Referring now to FIG. 3, the capacity assignment method of the present invention calculates, for each two-edge cut $(e_k,e_l)$, a demand $D(e_k,e_l)$, at block 41. Demand $D(e_k,e_l)$ is equal to the sum of all demands between the subsets of nodes on either side of two-edge cut $(e_k,e_l)$. It will be recalled that a two-edge cut divides the ring into two subsets of nodes. A first set of nodes X is the set of nodes between links $e_k$ and $e_l$. The second subset of nodes (N-X) is the set of nodes between links $e_l$ and $e_k$. For example, two-edge cut $(e_1,e_4)$ divides the nodes of ring 11 into a subset X consisting of nodes $n_1$, $n_3$, and $n_4$, and a second subset (N-X) consisting nodes $n_1$, $n_5$, and $n_6$. Demand $D(e_1,e_4)$ is equal to the sum of all demands between nodes $n_2$–$n_4$ and nodes $n_5$–$n_1$, which in the illustrated example is equal to thirty-six demand units. Computationally, the capacity assignment process of the present invention calculates the demand $D(e_k,e_l)$ as the sum of all demands $D(n_i,n_j)$ wherein i is greater than k and equal to or less than l and wherein j is greater than l and equal to or less than k.

As the capacity assignment method of the present invention calculates demands $D(e_k,e_l)$, the capacity assignment method of the present invention inserts a demand $D(e_k,e_l)$ for each two-edge cut $(e_k,e_l)$ into the two-edge cut array of FIG. 11, at block 43. Referring to FIG. 11, the demand values are inserted into demand column 23. Then, the capacity assignment process of the present invention lets z equal the maximum demand $D(e_k,e_l)$ over all two-edge cuts, at block 45. Referring to FIG. 11, the demands $D(e_k,e_l)$ have been computed and inserted into demand column 23. It will be noted that the maximum demand is thirty-seven demand units, which is the demand for two-edge cuts $(e_2,e_5)$ and $(e_3,e_6)$. Referring again to FIG. 3, the capacity assignment process of the present invention lets the capacity c(e) equal to z divided by two, plus 0.5 capacity units, for all edges e of the ring, at block 47. Since the maximum two-edge cut demand is thirty-seven, z is equal to 18.5 capacity units. Accordingly, the capacity for each edge $e_k$ is set to nineteen capacity units and that value is inserted into the capacity array of FIG. 12 for each link, at block 49.

Figure 4:
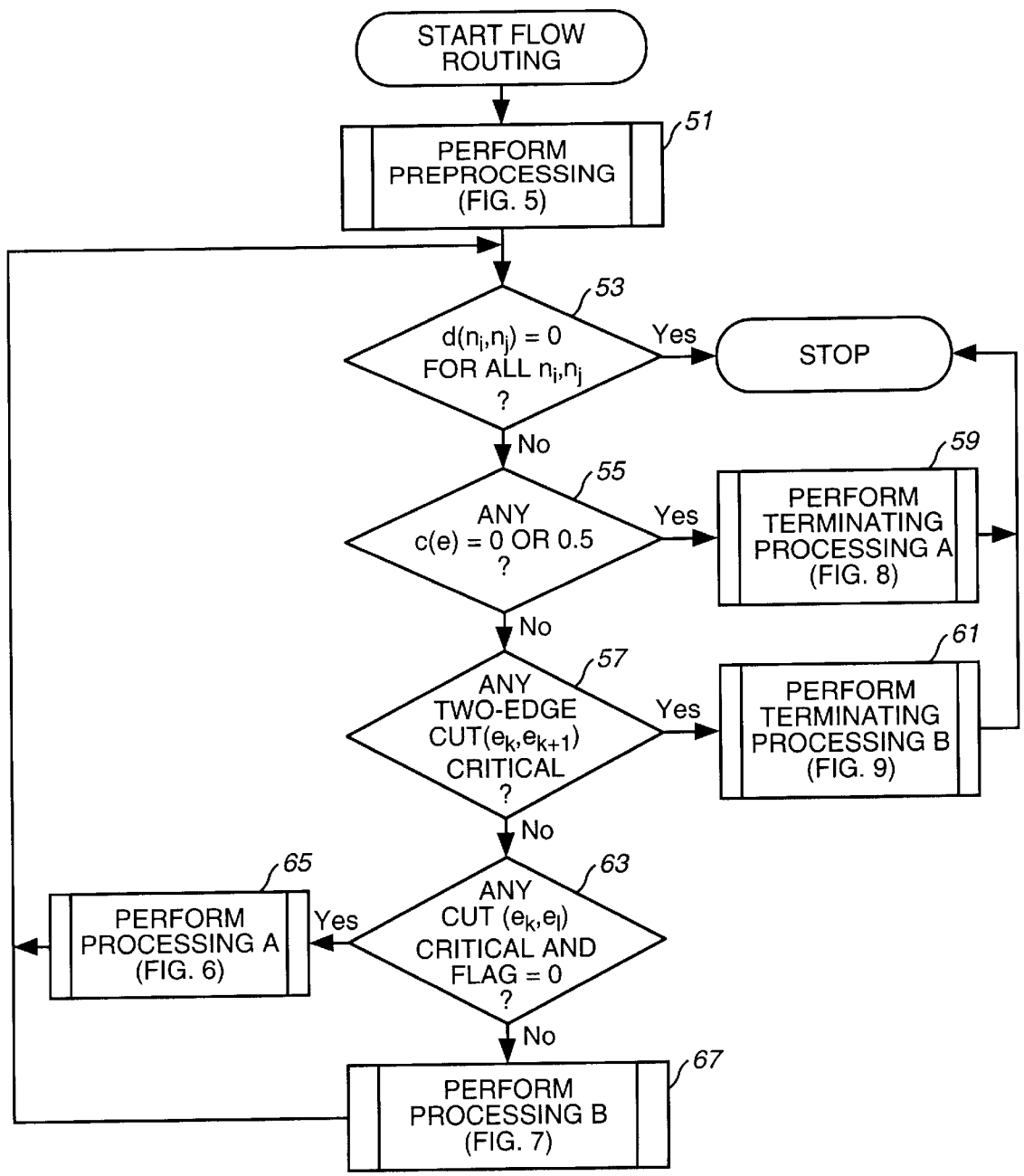
FIG. 4 is a high level flowchart of the flow routing process of the present invention.

Referring now to FIG. 4, there is shown a high level flow chart of flow routing processing according to the present invention. The flow routing process of the present invention performs preprocessing, as indicated generally at block 51, and shown in detail with respect to FIG. 5. Then, the flow routing process of the present invention checks for three terminating conditions at decision blocks 53–57. At decision block 53, the flow routing process of the present invention tests whether or not the demand $D(n_i,n_j)$ is equal to zero for all node pairs $(n_i,n_j)$. If each value in demand column 15 of FIG. 10 is equal to zero, then there are no more demands to route and the process is finished. If, at decision block 53, not all demands $D(n_i,n_j)$ are equal to zero, then the flow routing process of the present invention tests, at decision block 55 if any capacity c(e) is equal to zero or 0.5. The test of decision block 55 is processed with respect to the capacity matrix of FIG. 12. If any value in capacity column 31 is equal to zero or 0.5, processing proceeds to a terminating processing step A, as indicated generally at block 59, and shown in detail with respect to FIG. 8.

The flow routing process of the present invention tests for the third terminating condition at decision block 57, by determining whether any adjacent two-edge cut $(e_k,e_{k+1})$ is critical. As will be explained in detail hereinafter, a critical cut is a two-edge cut for which the cut difference is equal to zero or one. A critical adjacent two-edge cut indicates that all commodities remaining have the same origin and the flow routing problem effectively becomes a single commodity problem. If, at decision block 57, an adjacent two-edge cut is critical, then the system performs terminating process step B, as indicated generally at block 61, and shown in detail with respect to FIG. 9.

If, at decision block 57, it is determined that there are no terminating conditions, then the flow routing method of the present invention tests, at decision block 63, if any two-edge cut $(e_k,e_l)$ is critical and its flag is set to zero. A two-edge cut $(e_k,e_l)$ is a critical cut if the cut difference cut_diff $(e_k,e_l)$ is equal to zero or one. Referring to FIG. 11, it will be observed that two-edge cuts $(e_2,e_5)$ and $(e_3,e_6)$ are critical cuts. It will also be observed that in FIG. 11, the flag for those two-edge cuts is set to zero.

Figures 6, 7:
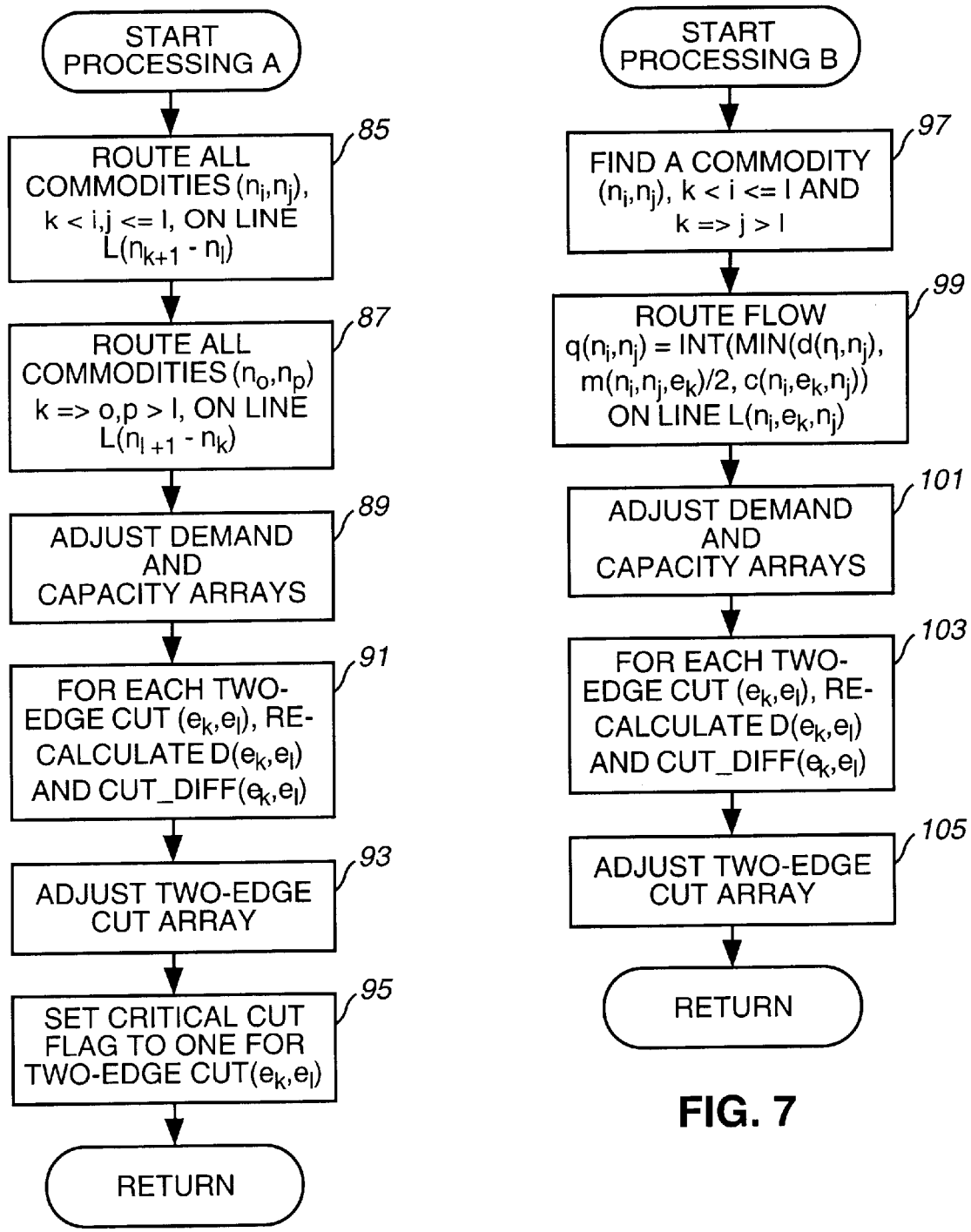
FIG. 6 is a flowchart of the processing step A of FIG. 4.
FIG. 7 is a flowchart of the processing step B of FIG. 4.

Referring again to FIG. 4, if there is a critical cut $(e_k,e_l)$ for which the flag is set to zero, then the flow routing method of the present invention performs processing step A, as indicated generally at block 65, and shown in detail with respect to FIG. 6. If there is no critical cut for which the flag is set to zero, then the flow routing method of the present invention performs processing step B, as indicated generally at block 67, and shown in detail with respect to FIG. 7. After performing processing steps A or B, processing returns to decision block 53 to test for the terminating conditions. Thus, the flow routing method of the present invention performs either processing step A at block 65, or processing step B at block 67, until the occurrence of a terminating condition.

Figure 5:
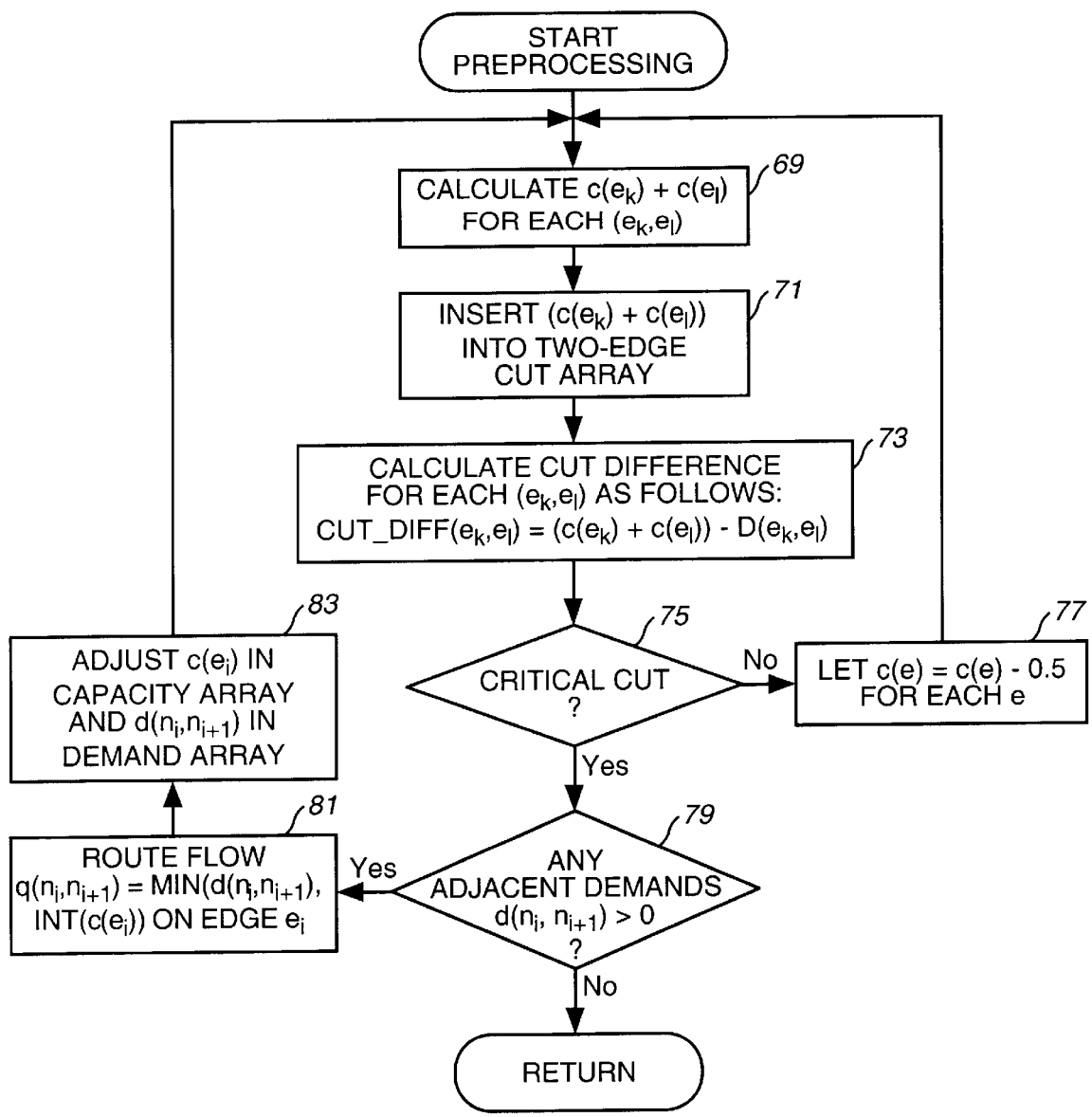
FIG. 5 is a flowchart of the preprocessing step of FIG. 4.

Referring now to FIG. 5, there is shown preprocessing according to the flow routing method of the present invention. During preprocessing, the method calculates for each two-edge cut $(e_k,e_l)$ a capacity $c(e_k)$ plus $c(e_l)$, at block 69. The calculation of block 69 is done with reference to the capacity array of FIG. 12. Referring to FIG. 12, initially, the available capacity of each link is nineteen capacity units. Thus, the capacity for each pair of links is equal to thirty-eight capacity units. The preprocessing method of the present invention inserts the calculated capacity into the two-edge cut array of FIG. 11, at block 71. Preprocessing calculates the cut difference cut_diff$(e_k,e_l)$ for each two-edge cut $(e_k,e_l)$, at block 73. Referring to FIG. 11, the cut differences in cut difference column 25 range from one to nineteen.

Referring again to FIG. 5, preprocessing tests, at decision block 75, if there is a critical cut. If the capacity routing process of the present invention is performed following the capacity assignment process of the present invention, there will always be a critical cut. However, the flow routing process of the present invention may be performed with a preassigned set of capacities, not formed according to the capacity assignment method of the present invention. The flow routing method of the present invention requires at least one critical cut. Accordingly, if, at decision block 75, there is no critical cut then the method sets the capacity c(e) equal to c(e) minus 0.5 capacity units for each link e, at block 77 and returns to block 69. Processing loops through decision block 75 and process block 77 until there is a critical cut. Then, the preprocessing tests, at decision block 79, if there are any adjacent demands $D(n_i,n_{i+1})$ greater than zero. If so, preprocessing routes a flow $q(n_i,n_{i+1})$ equal to the minimum of the demand $D(n_i,n_{i+1})$ and the integer capacity $C(n_i,n_{i+1})$ on the edge $e_i$ connecting nodes $n_i$ and $n_{i+1}$, at block 81. Referring to FIG. 10, it will be noted that there is a demand greater than zero between each pair of adjacent nodes. Thus, during preprocessing, those demands are routed. When a demand is routed, the links column 17 of FIG. 10 is updated to show how the links are routed. Also, when a demand is routed, the method of the present invention adjusts the capacity $c(e_i)$ in the capacity array and the demand $D(n_i,n_{i+1})$ in the demand array, at block 83. Then, preprocessing returns to block 69. Preprocessing continues until, at decision block 79, there are no adjacent demands greater than zero.

Referring again to FIG. 4, after preprocessing of Block 51, the flow routing method of the present invention tests for the occurrence of a terminating condition at decision blocks 53–57. If there is no terminating condition, then the system tests at decision block 63 if there is any critical two-edge cut $(e_k,e_l)$ for which the flag of column 27 of FIG. 11 is set to zero. If so, the flow routing method of the present invention performs processing step A as indicated generally at block 65, and shown in detail with respect to FIG. 6. Referring to FIG. 6, in processing step A, the method of the present invention routes all commodities $(n_i,n_j)$ wherein both $n_i$ and $n_j$ are on one side of critical cut $(e_k,e_l)$ on the line formed by the nodes on that side of the critical cut. Computationally, the method routes all commodities $(n_i,n_j)$ wherein i and j are greater than k and equal to or less than l on the line $l(n_{k+1},n_l)$. Processing step A also routes all commodities $(n_o,n_p)$ on the other side of the critical cut on the line formed by the nodes on that side of the critical cut, at block 87. Computationally, processing step A routes all commodities $(n_o,n_p)$ wherein o and p are equal to or less than k and greater than l on the line $l(n_{l+1},n_k)$. Then, processing adjusts the demand array of FIG. 10 by reducing the appropriate value in demand column 15 by the amount of flow routed and by inserting the appropriate links in links column 17, and adjusts the capacity array of FIG. 12 by reducing the available capacity in capacity column 31 for the link or links used in routing the demand, and updates the demand list of column 32, at block 89. Then, processing step A calculates for each two-edge cut $(e_k,e_l)$, the demand D $(e_k,e_l)$, and the cut difference cut_diff $(e_k,e_l)$, at block 91, and adjusts the two-edge cut array of FIG. 11 accordingly, at block 93. Then, preprocessing step A sets the cut flag to one for two-edge cut $(e_k,e_l)$ at block 95. When the flag is set to one, it indicates that processing step A does not need to be performed again with respect to that two-edge cut. After setting the critical cut flag, at block 95, processing returns to FIG. 4.

Referring again to FIG. 4, if, at decision block 63, there is no critical cut with a flag equal to zero, then the flow routing method of the present invention performs processing step B, as indicated generally at block 67 and shown in detail with respect to FIG. 7. Referring to FIG. 7, processing step B finds a commodity or demand $(n_i,n_j)$ greater than zero for which i is greater than k and equal to or less than l and for which j is less than or equal to k and greater than l, at block 97. Thus, at block 97, processing step B finds a demand to be routed between a pair of nodes on opposite sides of a critical cut. Then, at block 99, processing step B routes a flow $q(n_i,n_j)$ on a line $L(n_i,n_k,n_j)$. Flow $q(n_i,n_j)$ is equal to the minimum of:

(i) the minimum demand $d(n_i,n_j)$ between nodes $n_i$ and $n_j$;
(ii) a quantity $m(n_i,n_j,e_k)$ divided by two ($m(n_i,n_j,e_k)$ is the minimum cut difference of all two-edge cuts with both edges on line $L(n_i,n_k,n_j)$); and,
(iii) a capacity $c(n_i,e_k,n_j)$, which is the minimum capacity among the edges on the line $L(n_i,e_k,n_j)$. Preferably, line $L(n_i,n_k,n_j)$ is selected to have the fewest number of nodes. After routing flow $q(n_i,n_j)$ at block 99, processing step B adjusts the demand array of FIG. 10 and the capacity array of FIG. 12, at block 101. Then, processing step B calculates for each two-edge cut $(e_k,e_l)$ the demand D $(e_k,e_l)$ and the cut difference cut_diff $(e_k,e_l)$, at block 103. Then, processing step B adjusts the two-edge cut array of FIG. 11, at block 105 and returns to FIG. 4 processing.

Referring again to FIG. 4, the flow routing method of the present invention performs either processing step A or processing step B until the occurrence of a terminating condition. If, at decision block 53, there are no demands left to be routed, then processing stops. If, at decision block 55, any capacity c(e) is equal to zero or 0.5, then the flow routing method of the present invention performs terminating processing step A, as indicated at block 59 and shown in detail with respect to FIG. 8.

Figure 8:
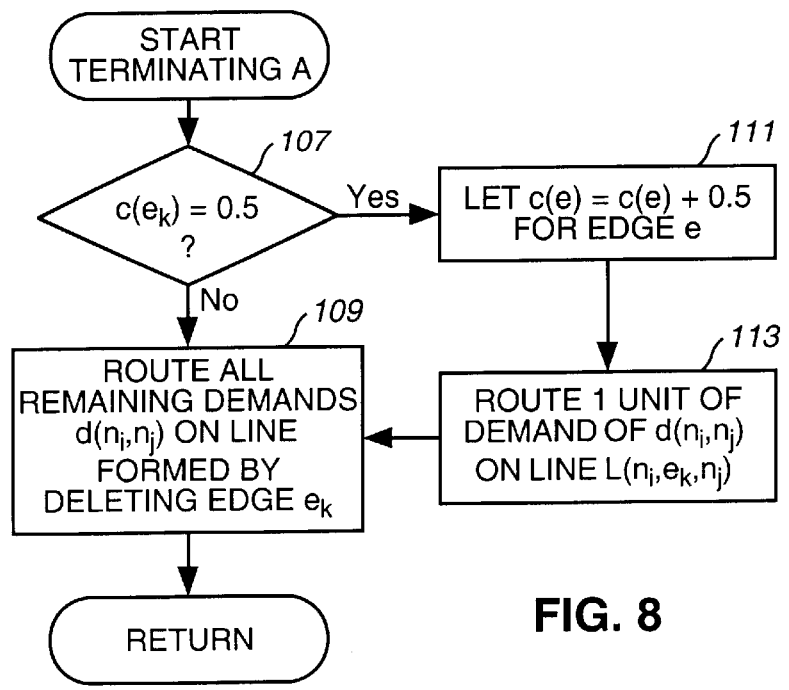
FIG. 8 is a flowchart of the terminating step A of FIG. 4.

Referring to FIG. 8, terminating step A tests, at decision block 107, if the capacity $c(e_k)$ that is equal to 0.5. If not, terminating step A routes all remaining demands $D(n_i,n_j)$ on the line formed by deleting edge $e_k$, at block 109, and returns to FIG. 4 processing where processing ends. If, at decision block 107, capacity $c(e_k)$ is equal to 0.5, then terminating step A adds 0.5 capacity units to each edge e, at block 111 and routes one unit of demand of $D(n_i,n_j)$ on line $L(n_i,e_k,n_j)$, at block 113. After routing one unit of demand at block 113, processing continues at block 109 and terminating step A routes all remaining demands on the line formed by deleting edge $e_k$.

Figure 9:
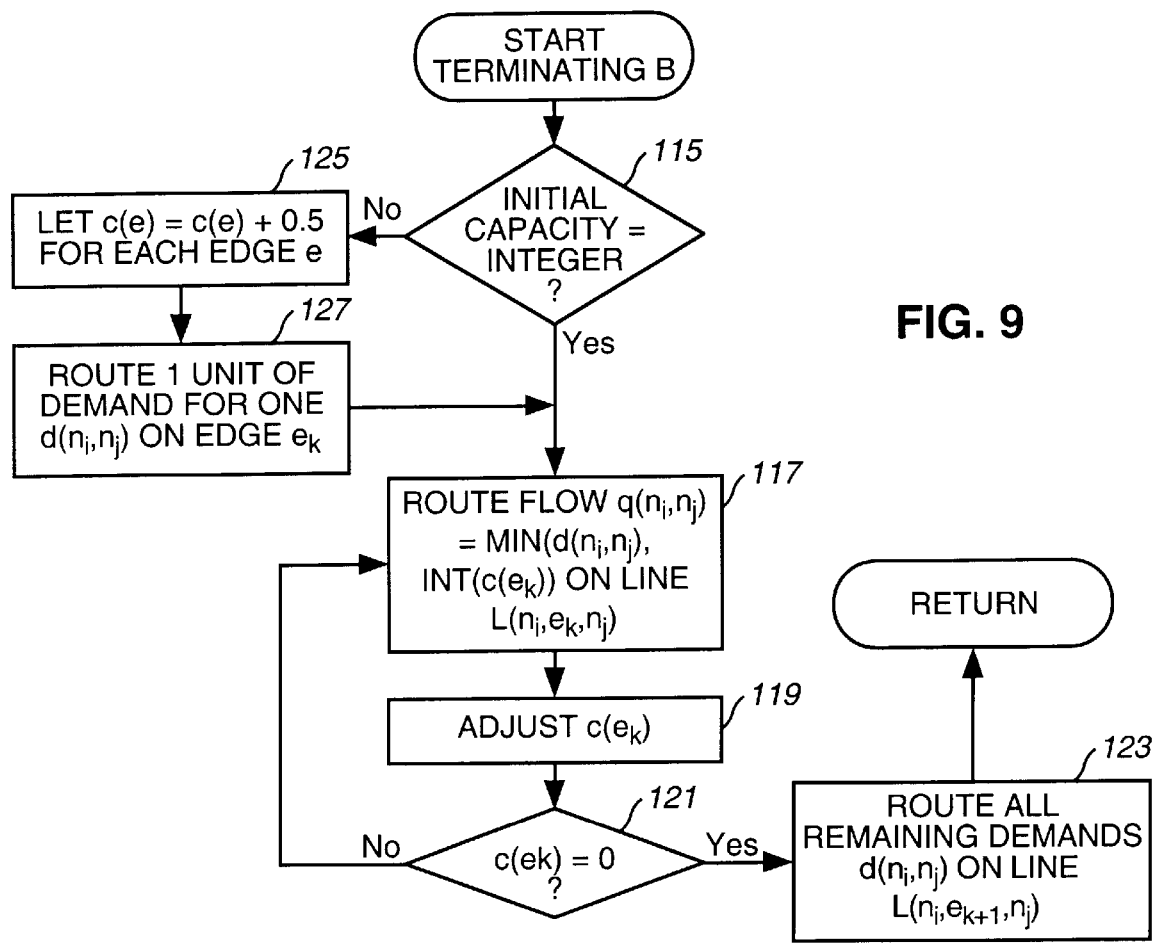
FIG. 9 is a flowchart of the terminating step B of FIG. 4.

Referring again to FIG. 4, if, at decision block 57, any adjacent two-edge cut $D(e_k,e_{k+1})$ is critical, then the flow routing method of the present invention performs terminating step B, as indicated generally at block 61 and shown in detail with respect to FIG. 9. Referring to FIG. 9, terminating step B tests, at decision block 115 if the initial capacity of edges e is equal to an integer. In the present invention, the initial capacity is always either an integer value or a integer value plus 0.5 capacity units. If, at decision block 115, the initial capacity is an integer, then terminating step B routes a flow $q(n_i,n_j)$ equal to the minimum of the demand $D(n_i,n_j)$, and the integer value of the capacity $c(e_k)$ on the line $L(n_i,n_k,n_j)$, at block 117. Terminating step B then adjusts the capacity $c(e_k)$ in the capacity array of FIG. 12, at block 119, and tests, at decision block 121 if capacity $c(e_k)$ is equal to zero. If not, processing returns to block 17 and terminating step B routes another flow on line $L(n_i,e_k,n_j)$, until the capacity of link $e_k$ is determined at decision block 121 to be equal to zero. Then, terminating step B routes all remaining demands $D(n_i,n_j)$ on the line $L(n_i,e_{k+1},n_j)$, at block 123 and returns to FIG. 4 processing where processing ends.

If, at decision block 115 the initial capacity of the links of the ring is not an integer value, then terminating step B adds one-half capacity unit to each edge e, at block 125, and routes one unit of demand $D(n_i,n_j)$ on link $e_k$, at block 127. Then, processing continues at block 117.

From the foregoing, it may be seen that the present invention provides an efficient method for assigning capacity and routing flow in an optical ring. The processes are essentially one-pass algorithms in that once flow is assigned, no re-routing is necessary. The running time is essentially proportional to the number of commodities as distinguished from other flow algorithms with running time proportional to $|N|$. A finite termination of the process is guaranteed since the number of commodities is finite.

What is claimed is:

1. A method of routing flow in a bi-directional line switched SONET ring, said bi-directional line switched SONET ring comprising nodes n interconnected by links e, with a demand $d(n_i,n_j)$ between each pair of nodes $(n_i,n_j)$ and each link $e_k$ having a capacity $c(e_k)$, which comprises the steps of:

(a) for each pair of links $(e_k,e_l)$, calculating a cut difference cut_diff$(e_k,e_l)$;

(b) if there is pair of links $(e_k,e_l)$ having a cut difference of zero or one and demands $d(n_i,n_j)>0$ for $k<i,j<=l$ and demands $d(n_o,n_p)>0$ for $k=>o,p>l$, routing the demands $d(n_i,n_j)$ on a line $L(n_{k+1},n_l)$ and routing the demands $d(n_o,n_p)$ on a line $L(n_{l+1},n_k)$ (b) if there is no pair of links $(e_k,e_l)$ having a cut difference of zero or one and demands $d(n_i,n_j)>0$ for $k<i,j<=l$ and demands $d(n_o,n_p)>0$ for $k=>o,p>l$, routing on a line $L(n_i,e_k,n_p)$ a flow $q(n_i,n_p)$ equal to:
 (i) the minimum of the demand $d(n_i,n_p)$,
 (ii) the minimum capacity of a link $e_k$ of line $L(n_i,e_k,n_p)$, and
 (iii) one-half the minimum cut difference of all two-edge cuts with both edges on line $L(n_i,e_k,n_p)$; and, (d) repeating steps (a) through (c) until the first to occur of:
 (i) the demand $d(n_i,n_j)$ for all node pairs $(n_i,n_j)$ is equal to zero;
 (ii) the capacity $c(e_k)$ of any link $e_k$ is less than one; and,
 (iii) any adjacent two-edge cut $(e_k,e_{k+1})$ has a cut difference of zero or one.

2. The method as claimed in claim 1 including the steps of:

upon the occurrence of condition (d)(ii), if the capacity $c(e_k)$ of link $e_k$ is equal to 0.5 capacity units, adding 0.5 capacity units to each link;

routing one unit of demand $d(n_i,n_j)$ on line $L(n_i,e_k,n_j)$; and, routing all remaining demands $d(n_i,n_j)$ on the line formed by deleting link $e_k$.

3. The method as claimed in claim 1 including the step of:

upon the occurrence of condition (d)(ii), if the capacity $c(e_k)$ of link $e_k$ is equal to zero capacity units, routing all remaining demands $d(n_i,n_j)$ on the line formed by deleting link $e_k$.

4. The method as claimed in claim 1 including the steps of:

upon the occurrence of condition (d)(iii), if the initial capacity $c(e)$ of each link e is a non-integer number of capacity units, adding 0.5 capacity units to each link;

routing one unit of demand $d(n_i,n_j)$ for one node pair $d(n_i,n_j)$ on line $L(n_i,e_k,n_j)$;

routing a flow $q(n_i,n_j)$ equal to the minimum of:
 (i) $d(n_i,n_j)$, and
 (ii) the integer capacity of link $e_k$ on line $L(n_i,e_k,n_j)$ until $c(e_k)$ is equal to zero; and, routing all remaining demands $d(n_i,n_j)$ on the line formed by deleting link $e_k$.

5. The method as claimed in claim 1 including the steps of:

upon the occurrence of condition (d)(iii), if the initial capacity $c(e)$ of each link e is an integer number of capacity units, routing a flow $q(n_i,n_j)$ equal to the minimum of:
 (i) $d(n_i,n_j)$, and
 (ii) the integer capacity of link $e_k$ on line $L(n_i,e_k,n_j)$ until $c(e_k)$ is equal to zero; and, routing all remaining demands $d(n_i,n_j)$ on the line formed by deleting link $e_k$.

6. The method as claimed in claim 1, including the steps of:

prior to step (b), determining if there is any critical two-edge cut; and, if there is no critical two-edge cut, reducing the capacity of each link by 0.5 capacity units until there is a critical two-edge cut.

7. The method as claimed in claim 1, including the step of:

prior to step (b) routing any adjacent demands $d(n_i,n_{i+1})$ on link $e_i$.

8. The method as claimed in claim 1, wherein said step of calculating a cut difference cut_diff$(e_k,e_l)$, comprises the steps of:

for each pair of links $(e_k,e_l)$, calculating the sum $c(e_k)+c(e_l)$;

for each pair of links $(e_k,e_l)$, calculating a demand $D(e_k,e_l)$ equal to the sum of all demands $d(n_i,n_j)$ wherein k is less than i and i is less than or equal to l, and k is equal to or greater than j and j is greater than l; and, for each pair of links $(e_k,e_l)$, calculating cut_diff$(e_k,e_l)=(c(e_k)+c(e_l))-D(e_k,e_l)$.

9. A method of routing flow in a bi-directional line switched SONET ring, said bi-directional line switched SONET ring comprising nodes n interconnected by links e, with a demand $d(n_i,n_j)$ between each pair of nodes $(n_i,n_j)$ and each link $e_k$ having a capacity $c(e_k)$, which comprises the steps of:

(a) for each two-edge cut $(e_k,e_l)$, calculating the sum $c(e_k)+c(e_l)$;

(b) for each two-edge cut $(e_k,e_l)$, calculating a demand $D(e_k,e_l)$ equal to the sum of all demands $d(n_i,n_j)$ wherein k is less than i and i is less than or equal to l, and k is equal to or greater than j and j is greater than l;

(c) for each two-edge cut $(e_k,e_l)$, calculating cut difference cut_diff$(e_k,e_l)=(c(e_k)+c(e_l))-D(e_k,e_l)$;

(d) if there is two-edge cut $(e_k,e_l)$ having a cut difference of zero or one and demands $d(n_i,n_j)>0$ for $k<i,j<=l$ and demands $d(n_o,n_p)>0$ for $k=>o,p>l$, routing the demands $d(n_i,n_j)$ on a line $L(n_{k+1},n_l)$ and routing the demands $d(n_o,n_p)$ on a line $L(n_{l+1},n_k)$;

(e) if there is no two-edge cut $(e_k,e_l)$ having a cut difference of zero or one and demands $d(n_i,n_j)>0$ for $k<i,j<=l$ and demands $d(n_o,n_p)>0$ for $k=>o,p>l$, routing on a line $L(n_i,e_k,n_p)$ a flow $q(n_i,n_p)$ equal to:
 (i) the minimum of the demand $d(n_i,n_p)$,
 (ii) the minimum capacity of a link $e_k$ of line $L(n_i,e_k,n_p)$, and
 (iii) one-half the minimum cut difference of all two-edge cuts with both edges on line $L(n_i,e_k,n_p)$; and, (f) repeating steps (a) through (e) until the first to occur of:
 (i) the demand $d(n_i,n_j)$ for all node pairs $(n_i,n_j)$ is equal to zero;
 (ii) the capacity $c(e_k)$ of any link $e_k$ is less than one; and,
 (iii) any adjacent two-edge cut $(e_k,e_{k+1})$ has a cut difference of zero or one.

10. The method as claimed in claim 9 including the steps of:

upon the occurrence of condition (f)(ii), if the capacity $c(e_k)$ of link $e_k$ is equal to 0.5 capacity units, adding 0.5 capacity units to each link;

routing one unit of demand $d(n_i,n_j)$ on line $L(n_i,e_k,n_j)$; and, routing all remaining demands $d(n_i,n_j)$ on the line formed by deleting link $e_k$.

11. The method as claimed in claim 9 including the step of:

upon the occurrence of condition (f)(ii), if the capacity $c(e_k)$ of link $e_k$ is equal to zero capacity units, routing all remaining demands $d(n_i,n_j)$ on the line formed by deleting link $e_k$.

12. The method as claimed in claim 9 including the steps of:

upon the occurrence of condition (f)(iii), if the initial capacity $c(e)$ of each link e is a non-integer number of capacity units, adding 0.5 capacity units to each link;

routing one unit of demand $d(n_i,n_j)$ for one node pair $d(n_i,n_j)$ on line $L(n_i,e_k,n_j)$;

routing a flow $q(n_i,n_j)$ equal to the minimum of:
(i) $d(n_i,n_j)$, and
(ii) the integer capacity of link $e_k$ on line $L(n_i,e_k,n_j)$ until $c(e_k)$ is equal to zero; and, routing all remaining demands $d(n_i,n_j)$ on the line formed by deleting link $e_k$.

13. The method as claimed in claim 9 including the steps of:

upon the occurrence of condition (f)(iii), if the initial capacity $c(e)$ of each link e is an integer number of capacity units, routing a flow $q(n_i,n_j)$ equal to the minimum of:
(i) $d(n_i,n_j)$, and
(ii) the integer capacity of link $e_k$ on line $L(n_i,e_k,n_j)$ until $c(e_k)$ is equal to zero; and, routing all remaining demands $d(n_i,n_j)$ on the line formed by deleting link $e_k$.

14. The method as claimed in claim 9, including the steps of:

prior to step (d), determining if there is any two-edge cut with a cut difference of zero or one; and, if there is no two-edge cut with a cut difference of zero or one, reducing the capacity of each link by 0.5 capacity units until there is a two-edge cut with a cut difference of zero or one.

15. The method as claimed in claim 9, including the step of:

prior to step (d) routing any adjacent demands $d(n_i,n_{i+1})$ on link $e_i$.

16. A method of routing flow in a bi-directional line switched SONET ring, said bi-directional line switched SONET ring comprising nodes interconnected by links, with a demand between each pair of nodes and each link having a capacity, which comprises the steps of:

(a) defining for each pair of links of said ring a two-edge cut, each two-edge cut dividing said ring into a first set of nodes on one side of said two-edge cut and a second set of nodes on the other side of said two-edge cut;

(b) calculating, for each two-edge cut, the sum of demands between the nodes of said first set and the nodes of said second set;

(c) calculating, for each two-edge cut, the sum of the capacities of the links of said each two-edge cut;

(d) calculating, for each two-edge cut, a cut difference equal to the difference between the sum of the capacities of the links of said each two-edge cut and the sum of demands between the nodes of said first set and the nodes of said second set;

(e) if any two-edge cut has a cut difference equal to or less than one and a demand greater than zero between nodes of said first set or a demand greater than zero between nodes of said second set, routing the demands between nodes of said first set on a line formed by the nodes of said first set and routing the demands between nodes of said second set on a line formed by the nodes of said second set;

(f) if any two-edge cut has a cut difference equal to or less than one and no demand greater than zero between nodes of said first set and no demand greater than zero between nodes of said second set, routing a portion of the demand between a selected node of said first set and a selected node of said second set on a line formed by the selected node of said first set and the selected node of said second set; and, repeating steps (b) through (f) until a terminating condition occurs.

17. The method as claimed in claim 16, wherein said demand portion of the demand between a selected node of said first set and a selected node of said second set is equal to the minimum of:

(i) the demand between said selected node of said first set and said selected node of said second set;

(ii) the minimum capacity of a link on said line formed by the selected node of said first set and the selected node of said second set; and, (iii) one-half the capacity of any adjacent two-edge cut on said line formed by the selected node of said first set and the selected node of said second set.

18. The method as claimed in claim 16, wherein a terminating condition occurs whenever the demand between each pair of nodes of said rings is equal to zero.

19. The method as claimed in claim 16, wherein a terminating condition occurs whenever the capacity of any link of said ring is less than one.

20. The method as claimed in claim 16, wherein any adjacent two-edge cut has a cut difference equal to or less than one.

21. The method as claimed in claim 16, wherein the line formed by the selected node of said first set and the selected node of said second set is the line between the selected node of said first set and the selected node of said second set with the fewest number of nodes.

* * * * *